(12) United States Patent
Parnell et al.

(10) Patent No.: US 11,068,171 B2
(45) Date of Patent: Jul. 20, 2021

(54) HIGH AVAILABILITY STORAGE ACCESS USING QUALITY OF SERVICE BASED PATH SELECTION IN A STORAGE AREA NETWORK ENVIRONMENT

(71) Applicant: NetApp, Inc., Sunnyvale, CA (US)

(72) Inventors: Joey Parnell, Wichita, KS (US); Steven Schremmer, Wichita, KS (US); Brandon Thompson, Wichita, KS (US); Mahmoud K. Jibbe, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/653,165

(22) Filed: Oct. 15, 2019

(65) Prior Publication Data
US 2020/0042195 A1 Feb. 6, 2020

Related U.S. Application Data

(63) Continuation of application No. 15/923,445, filed on Mar. 16, 2018, now Pat. No. 10,459,640.

(60) Provisional application No. 62/565,855, filed on Sep. 29, 2017.

(51) Int. Cl.
*G06F 12/00* (2006.01)
*G06F 3/06* (2006.01)
*G06F 11/20* (2006.01)

(52) U.S. Cl.
CPC .......... *G06F 3/0617* (2013.01); *G06F 3/067* (2013.01); *G06F 3/0611* (2013.01); *G06F 3/0635* (2013.01); *G06F 3/0658* (2013.01); *G06F 11/20* (2013.01)

(58) Field of Classification Search
CPC .... G06F 3/0617; G06F 3/0611; G06F 3/0635; G06F 3/0658; G06F 3/067
See application file for complete search history.

(56) References Cited

U.S. PATENT DOCUMENTS

| 6,675,268 | B1 * | 1/2004 | DeKoning | .............. | G06F 3/061 |
| | | | | | 710/117 |
| 10,459,640 | B2 | 10/2019 | Parnell et al. | | |
| 2008/0123661 | A1 * | 5/2008 | Steets | ..................... | H04L 45/22 |
| | | | | | 370/395.21 |

* cited by examiner

*Primary Examiner* — Shawn X Gu
(74) *Attorney, Agent, or Firm* — Haynes and Boone, LLP (57) ABSTRACT

A method, a computing device, and a non-transitory machine-readable medium for performing a multipath selection based on a determined quality of service for the paths. An example method includes a host computing device periodically polling a storage system for path information including an indication of a recommended storage controller. The host computing device periodically determines a quality of service information corresponding to a plurality of paths between the host computing device and a storage volume of the storage system, where at least one of the plurality of paths including the recommended storage controller. The host computing device identifies a fault corresponding to a path of the plurality of paths that routes I/O from the host computing device to the storage volume. The host computing device re-routes the I/O from the path to a different path of the plurality of paths, where the different path is selected for the re-routing based on the quality of service information and the path information.

20 Claims, 4 Drawing Sheets

FIG. 1

```
                                                  200
┌─────────────────────────────────────────────────────────────────────────────────────┐
│ Periodically polling, by a host computing device, a storage system for path         │
│ information including an indication of a recommended storage controller             │
│                                     202                                             │
└─────────────────────────────────────────────────────────────────────────────────────┘
                                         │
                                         ▼
┌─────────────────────────────────────────────────────────────────────────────────────┐
│ Periodically determining, by the host computing device, quality of service          │
│ information corresponding to a plurality of paths between the host computing        │
│ device and a storage volume of the storage system, at least one of the plurality    │
│ of paths including the recommended storage controller                               │
│                                     204                                             │
└─────────────────────────────────────────────────────────────────────────────────────┘
                                         │
                                         ▼
┌─────────────────────────────────────────────────────────────────────────────────────┐
│ Identifying, by the host computing device, a fault corresponding to a path of the   │
│ plurality of paths that routes input/output (I/O) between the host computing        │
│ device and the storage volume                                                       │
│                                     206                                             │
└─────────────────────────────────────────────────────────────────────────────────────┘
                                         │
                                         ▼
┌─────────────────────────────────────────────────────────────────────────────────────┐
│ Re-routing, by the host computing device, the I/O of the host computing device      │
│ from the path to a different path of the plurality of paths, wherein the different  │
│ path is selected for the re-routing based on the quality of service information     │
│ and the path information                                                            │
│                                     208                                             │
└─────────────────────────────────────────────────────────────────────────────────────┘
```

HIGH AVAILABILITY STORAGE ACCESS USING QUALITY OF SERVICE BASED PATH SELECTION IN A STORAGE AREA NETWORK ENVIRONMENT

CROSS-REFERENCE TO RELATED APPLICATIONS

This application is a continuation of U.S. Pat. No. 10,459,640, filed on Mar. 16, 2018, which claims the benefit of U.S. Provisional Application No. 62/565,855, filed on Sep. 29, 2017, each of which is incorporated herein by reference in its entirety.

TECHNICAL FIELD

The present description relates to memory and distributed data storage, and more specifically to providing high availability storage device access in a storage area network.

BACKGROUND

Customers deploying storage solutions expect high availability and consistent low latency. In the past, complex multipath/failover drivers were developed for Small Computer System Interface (SCSI) protocols to provide access to storage arrays. Emerging technologies such as Non-Volatile Memory Express over Fabrics (NVMeoF) protocols, however, have disrupted the status quo regarding SCSI technologies.

In more detail, deployment of NVMEoF technology in storage array networks (SAN) environments has outpaced the development of its communication protocol specification, thereby leading to a gap in enterprise class multipath capabilities. For example, approaches to interfacing a host controller to non-volatile memory (NVM) have been expanded to provide data access between a host computer and storage devices over a network. This expansion has occurred faster than the expansion of the existing specifications, particularly with respect to drivers providing multipath/failover capabilities.

Moreover, with the development of new communication technologies, such as NVMeoF, there is an increased expectation of low latency access and high availability, which is currently not able to be met to the extent desired by users of the technology. Therefore, there is a need to improve communication techniques, including those using the NVMeoF and SCSI protocols, among others, to meet desired high availability and low latency expectations in a SAN environment.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for providing high-availability access to data storage and improving latency. As described herein, a host computing device includes a multipath driver that selects a path between the host computing device and a storage volume in a storage system using a quality of service selection technique. The quality of service selection technique takes into account performance metrics such as input and/or output (I/O) response times and data throughput, with the result being faster and more efficient data routing than conventional random or round robin based path selection techniques.

The improved path selection techniques discussed above allow systems using NVMeoF and SCSI protocols, among others, to bridge the gap in current specifications, such that the technology advantages offered by these protocols are able to be fully utilized. That is, the routing technology itself is improved to more efficiently communicate data over a network, thereby improving the computer technology and solving networking-centric problems including latency and failover issues. The improved path selection techniques allow storage systems to meet (and exceed) latency and high availability expectations of the users of the storage systems.

Additionally, the host computing device provides fault recovery when a fault is detected, such as when a cable, switch, or component failure occurs. When a fault is detected, the host computing device re-routes I/O to a non-faulted path to the storage volume based on the determined quality of service metrics (e.g., response time and/or throughput).

Moreover, the host computing device further improves path selection by also taking into account a preferred path to the storage volume that is recommended by a storage controller at the storage server. The storage controller determines the preferred path between the host computing device and a storage volume using information including (1) the storage controller indicated by a user as being the optimal storage controller when provisioning the storage volume, (2) identifying storage volume ownership by a particular storage controller, and/or identifying amounts of I/O corresponding to the storage volume that are currently processed by the storage controllers.

The example storage system further is able to optimize path selection by transferring volume ownership between multiple storage controllers. For example, when a fault is detected with respect to a path, the storage system may transfer volume ownership to a storage controller that previously was not the owner of the storage volume. When the faulted path is recovered, the storage controller firmware may then transfer volume ownership to the recovered path (or to another path that is identified as an optimal path) to restore optimal I/O performance for the storage user.

Many storage users are in a highly-tuned SAN environment and expect volumes to be owned by the storage controller that they selected to meet the performance demands of their host applications. Using the above techniques, the host computing device and storage controller coordinate with one another to optimize selection of the path for communicating I/O between the host computing device and a storage volume accessed by the storage controller. The techniques described herein address challenges in these areas, and provide valuable benefits, such as by meeting performance demands of enterprise-class users that demand high availability for mission-critical big data analytics and/or latency-sensitive workloads. Accordingly, the techniques described herein provide valuable improvements to computing technology.

Figure 1:
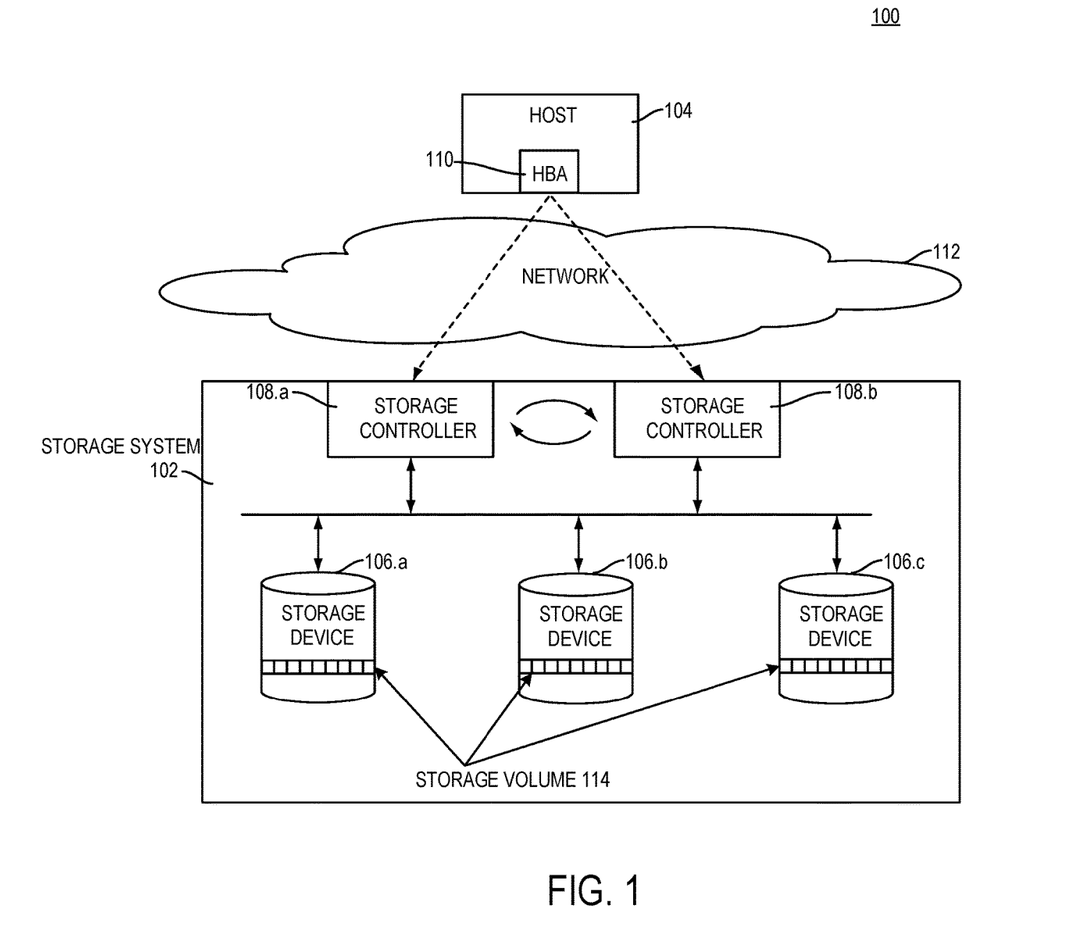
FIG. 1 is an organizational diagram of a data storage architecture, according to aspects of the present disclosure.

A data storage architecture 100, in which various embodiments may be implemented, is described with reference to FIG. 1. The data storage architecture 100 includes a storage system 102 in communication with a host 104 (e.g., a host computing device). The storage system 102 processes data transactions on behalf of other computing systems including one or more hosts, exemplified by the host 104 (e.g., there may be any number of hosts 104, with one illustrated for purposes of discussion). The storage system 102 may perform tasks to process data transactions (e.g., requests to read and/or write data) from one or more of the hosts, and take actions such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 and a single host 104 are illustrated, although any number of hosts may be in communication with any number of storage systems.

While the storage system 102 and the host 104 are referred to as singular entities, a storage system 102 and host 104 may each include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The processor may be, for example, a microprocessor, a microprocessor core, a microcontroller, an application-specific integrated circuit (ASIC), etc.

The instructions, when executed by the processor, cause the processor to perform various operations described herein with respect to the storage controllers 108.a, 108.b in the storage system 102 in connection with embodiments of the present disclosure. Instructions may also be referred to as code. The terms "instructions" and "code" should be interpreted broadly to include any type of computer-readable statement(s). For example, the terms "instructions" and "code" may refer to one or more software applications, programs, routines, sub-routines, functions, procedures, etc. "Instructions" and "code" may include a single computer-readable statement or many computer-readable statements.

The computing system may also include a memory device such as a random access memory (RAM); a non-transitory computer-readable storage medium such as a magnetic hard disk drive (HDD), one or more NVM memory devices, a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106.a, 106.b, 106.c that include one or more storage volumes, such as storage volume 114, and responds to host's 104 data transactions so that the storage devices 106.a, 106.b, 106.c appear to be directly connected (local) to the host 104. In various examples, the storage devices 106.a, 106.b, 106.c include hard disk drives (HDDs), solid state drives (SSDs), optical drives, and/or any other suitable volatile or non-volatile data storage medium. In some embodiments, the storage devices 106.a, 106.b, 106.c are relatively homogeneous (e.g., having the same manufacturer, model, and/or configuration). However, it is also common for the storage system 102 to include a heterogeneous set of storage devices 106.a, 106.b, 106.c that includes storage devices of different media types from different manufacturers with notably different performance.

The storage system 102 may group storage devices for speed and/or redundancy using a virtualization technique such as RAID (Redundant Array of Independent/Inexpensive Disks), such that storage volumes are spread among multiple storage devices. With respect to SCSI protocols, a storage volume (e.g., storage volume 114) may be identified by a Logical Unit Number (LUN). Storage volume 114 includes storage space that is spread across storage devices 106.a, 106.b, and 106.c. Accordingly, data that is stored in storage volume 114 includes data portions that are stored on one or more of storage devices 106.a, 106.b, and 106.c.

The storage system 102 also includes one or more storage controllers 108.a, 108.b in communication with the storage devices 106.a, 106.b, 106.c and any respective caches (not shown). The storage controllers 108.a, 108.b exercise low-level control over the storage devices 106.a, 106.b, 106.c in order to execute (perform) data transactions on behalf of the host 104. The storage controllers 108.a, 108.b are illustrative only; as will be recognized, more or fewer may be used in various embodiments.

In the present example, the storage controllers implement NVMeoF as a host controller interface to connect hosts (e.g., host 104) to data stored in storage devices (e.g., storage device 106.a, 106.b, and/or 106.c). A host controller interface to access non-volatile memory may be implemented in accordance with the Non-Volatile Memory Express (NVMe) specification. Further, NVMeoF may be used to allow NVMe message-based commands to provide data access between a host computer and storage devices over a network such as Ethernet, Fibre Channel (FC), and InfiniBand (IB). These are by way of example. Other approaches benefit from the aspects described herein as well, with NVMe and NVMeoF used by way of example, as described below.

NVMe utilizes namespaces for storage volumes in place of LUNs. That is, rather than a LUN, NVMe provides a namespace identifier. NVMeoF adds a layer to NVMe for transports other than memory, including connection, discovery service, and so forth. NVMe includes differences from SCSI, such as reduced complexity and fewer commands. Moreover, NVMe is queuing focused, to provide greater I/O per CPU cycle. Further, NVMe provides PCIe support. NVMe may be implemented over fabrics, as described in the NVMeoF specification.

Because conventional NVMeoF does not provide native asymmetric support (as in SCSI), I/O paths are treated equally by default. Asymmetric support may include providing a separate volume cache for each storage controller, where each volume cache is not shared between multiple storage controllers. On the other hand, symmetric support may include providing at least one shared volume cache that is accessible by multiple storage controllers.

For conventional storage arrays with symmetric I/O access, round robin may be used to access data. With round robin access, I/O between a host and a storage controller generally has similar access characteristics as I/O between the host and other storage controllers of the storage system. For storage arrays with asymmetric I/O access, however, round robin is non-optimal as I/O to the non-optimized path may suffer a performance penalty. That is, I/O performance characteristics may differ for each storage volume as the volume caches of the storage controllers may be configured differently and/or store different data. As an example, storage controller 108.a may have data stored in its local volume cache, such that host 104 can access the data from the volume cache, and storage controller 108.b may not have the data stored in its local volume cache, such that the storage controller 108.b would need to retrieve the data from the storage volume 114 of storage devices 106.a, 106.b and/or 106.c, and update its local volume cache to include the data.

For the reasons provided above, I/O performance characteristics for routing I/O between a host computing device (e.g., host 104) and the storage controllers (e.g., storage controller 108.a and 108.b) may differ depending on which storage controller the host accesses. Accordingly, round robin path selection is non-optimal with respect to storage arrays with asymmetric I/O access. The present data storage architecture 100 addresses this issue by providing path selection techniques that improve performance by selecting optimal paths for routing I/O between host computing devices and storage volumes.

Figure 2:
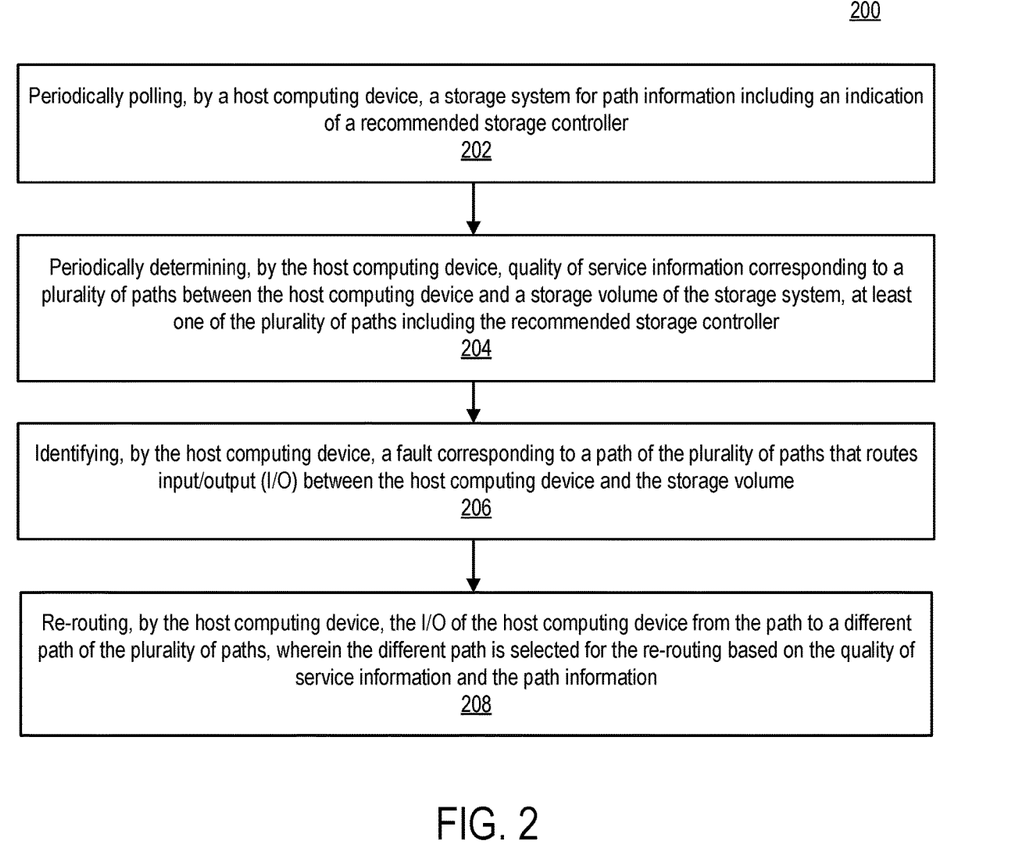
FIG. 2 is a flow diagram of a multipath failover method, according to aspects of the present disclosure.

Optimal path selection techniques are described in further detail with respect to FIG. 2, which describes that these path selection techniques include quality of service metrics that are relied upon to select an optimized path for each storage volume. In some examples, this selecting is performed by a daemon on the host 104 that requests optimal path information from the storage controller 108 (referred to generally herein for concepts relating to either 108.a and/or 108.b). In some examples, at the time of initial fabric connection, a path is selected and use of that path is maintained until a path failure occurs, at which time a new path is selected based on both the determined quality of service metrics and the optimal path information that is provided by the storage controller 108.

In the present example, the data storage architecture 100 provides an optimized data-cache coherency model and a lean I/O path with concept of volume "ownership." In more detail, each storage controller 108 is assigned as an owner of one or more storage volumes, and is a preferred storage controller for the purposes of routing I/O to the storage volumes for which it is assigned ownership. Thus, the storage controller 108 that is assigned ownership of a storage volume is generally included in the path to the storage volume, with non-owning storage controllers generally not being selected for routing the I/O to the storage volume.

Exceptions to the above ownership assignments are provided, for example, when faults occur. Moreover, the storage system 102 balances volume ownership among the storage controller to optimize performance. Rebalancing occurs periodically, as well as upon detection of faults and/or fault recovery to provide further performance optimization. Such volume ownership techniques simplify data-caching implementation and hardware design, and minimize I/O latency at lower product cost.

Having at least two storage controllers 108.a, 108.b may be useful, for example, for failover and load balancing purposes in the event of equipment failure of either one. Storage system 102 tasks, such as those performed by storage controller 108.a and 108.b, are configured to be monitored for performance statistics, such that data transactions and tasks may be balanced among storage controllers 108.a, 108.b via load balancing techniques, as well as between CPU cores of each storage controller 108.a, 108.b. The storage system 102 may also be communicatively coupled to a user display for performing configuration, displaying diagnostic and performance information, application output, and/or other suitable data.

With respect to the host 104, a host 104 includes any computing resource that is operable to exchange data with a storage system 102 by providing (initiating) data transactions to the storage system 102. The host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol.

In various embodiments, the HBA 110 includes Serial Attached SCSI (SAS), iSCSI, InfiniBand, Fibre Channel, NVMe, NVMeoF, and/or Fibre Channel over Ethernet (FCoE) bus adapters. Other suitable protocols include SATA, eSATA, PATA, USB, and FireWire. The HBA 110 of the host 104 may be coupled to the storage system 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs within the host 104. In some embodiments, the multiple links operate in parallel to increase bandwidth.

In some examples, the host 104 includes a multipath driver that is used for the determining of the quality of service information and selecting of paths for routing I/O to the storage volumes of the storage system 102. The multipath driver selects paths based on the determined quality of service information, and based on path recommendations received from the storage system 102. Such path recommendations may also be based on storage controller 108 volume ownership information and/or other information available to the storage system 102, as described in more detail below.

FIG. 2 illustrates a flow diagram of a multipath failover method 200, as is illustrated according to aspects of the present disclosure. This method may be performed using the components described with respect to the data storage architecture 100 that is shown in FIG. 1. For example, the method 200 may be implemented by one or more processors of a host computing device (e.g., host 104) that are in communication via a network (e.g., network 112) with one or more storage controllers (e.g., 108.a and/or 108.b) of a storage system (e.g., storage system 102). In the present example, these one or more processors execute computer-readable instructions to perform the functions described herein. It is understood that additional steps can be provided before, during, and after the steps of method 200, and that some of the steps described can be replaced or eliminated for other embodiments of the method 200.

In some examples, by default a multipath driver of a host computing device may treat paths equivalently, with no notion of volume ownership or preferred ownership and selects any available path at random. This path may be used until a fault is identified with respect to the path, or until the multipath driver identifies an optimal path, as determined based on quality of service metrics and/or path information provided by a storage system.

At action 202, a host computing device periodically polls a storage system for path information for routing I/O between the host computing device and a storage volume (e.g., storage volume 114). In the present example, the path information includes an indication of a recommended storage controller for routing the I/O. In some examples, a firmware of a storage controller of the storage system provides the indication of the recommended storage controller by using an optimal storage controller selection technique. This optimal storage controller selection technique may indicate a recommended/preferred storage controller by accessing a stored input from a user that identifies a recommended/preferred storage controller. In the present example, the user provides the input that identifies the recommended storage controller while provisioning storage volumes of one or more storage devices (e.g., storage device 106.a, 106.b, and/or 106.c).

For example, a user may provision the storage volume to prioritize: (1) a current path; (2) a path that includes a storage controller that is an owner of the storage volume; or (3) a path that includes a storage controller that handles a majority of the I/O corresponding to the storage volume. Accordingly, the provisioning by the user determines the path information that the storage system provides to the host computing device, where the path information includes a recommended storage controller for handling the I/O with respect to the storage volume.

At action 204, the host computing device periodically determines quality of service information corresponding to a plurality of paths between the host computing device and a storage volume of the storage system, at least one of the plurality of paths including the recommended storage controller. In some examples, the quality of service is based on a determined response time and/or throughput metric corresponding to the I/O that is communicated between the host computing device and the storage volume using the paths.

In some examples, response time is determined using non-read-write protocol-level commands, such as SCSI Inquiry (for a SCSI protocol) or NVMe Identify (for an NVMe protocol). In some examples, throughput is determined via read commands to a specific logical block address (LBA) range or read/write commands to a reserved LBA range of the storage volume. Specific throughput amounts may also be measured by sending reads/writes with varying amounts of LBAs (i.e., using different transfer sizes). In some examples, each path is ranked relative to the other paths based on the determined quality of service information.

At action 206, the host computing device identifies a fault corresponding to a path of the plurality of paths that routes I/O from the host computing device to the storage volume. The fault may be identified based on a failure of a cable, switch, or component failure, such that the host computing device identifies increased latency or communication failures.

At action 208, the host computing device, re-routes the I/O of the host computing device from the path to a different path of the plurality of paths. In the present example, the different path is selected for the re-routing based on the quality of service information and the path information received from the storage system.

In some examples, path selection methods include the host I/O following the preferred path that is recommended by the storage system. If the preferred path is available, the preferred path is considered the optimal path. In some examples, the storage system uses host connectivity awareness tracking information to failback the volume ownership after a path is restored. Techniques for determining host connectivity awareness tracking information are described further in U.S. patent application Ser. No. 14/251,082 (U.S. Patent Application Publication 2015/0293708), entitled Connectivity-Aware Storage Controller Load Balancing, and which is hereby incorporated by reference in its entirety. In some examples, connectivity awareness is based on receipt of specific protocol-level discovery commands (e.g., SCSI Inquiry, NVMe Identify).

Further, such techniques may be improved by applying a threshold minimum number of paths between the storage controller and the host computing device, in order to recommend a storage controller. That is, a storage controller may be recommended when it also meets the minimum number of path threshold or when an equivalent number of paths has been observed to send the specific protocol-level discovery commands from a host to multiple storage controllers (e.g., two storage controllers). This may remove limitations on bandwidth in the event that there is an HBA, cable, link, switch, or other component failure.

The above approach introduces a notion of quality of service path policy selection to the host computing device, thereby providing an improved system-level performance based on measurement of metrics corresponding to I/O. Moreover, the storage controller recommendations provided by the storage system further provide users with the opportunity to configure a static or dynamic environment to value a preferred path or current path, respectively. In this way, an optimal path selection may be abstracted from the host computing device.

Figure 3:
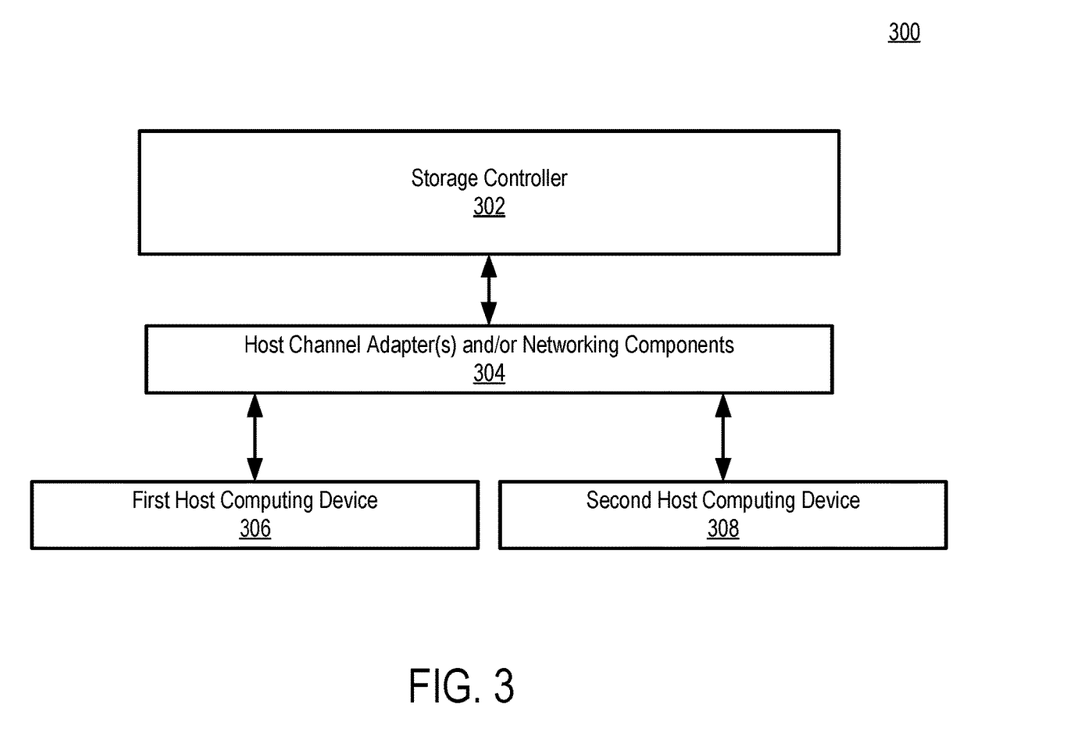
FIG. 3 is an organization diagram of a data storage architecture including multiple host computing devices, according to aspects of the present disclosure.

A data storage architecture 300 including multiple host computing devices, in which various embodiments may be implemented, is shown in FIG. 3. In the present example, the data storage architecture 300 includes NVMe 1.2.1 support, including reservations, provides Fabric co-existence (iSER, SRP), and includes a browser based, on box, system manager in a storage system including a storage controller 302. The depicted configuration provides low latency for a mixed read/write workload.

As shown, the data storage architecture 300 includes the storage controller 302 that is communicatively coupled via a host channel adapter and/or one or more networking components 304 to a first host computing device 306 and to a second host computing device 308. In some examples, the first host computing device 306 includes an operating system that is different than an operating system included on the second host computing device 308.

Figure 4:
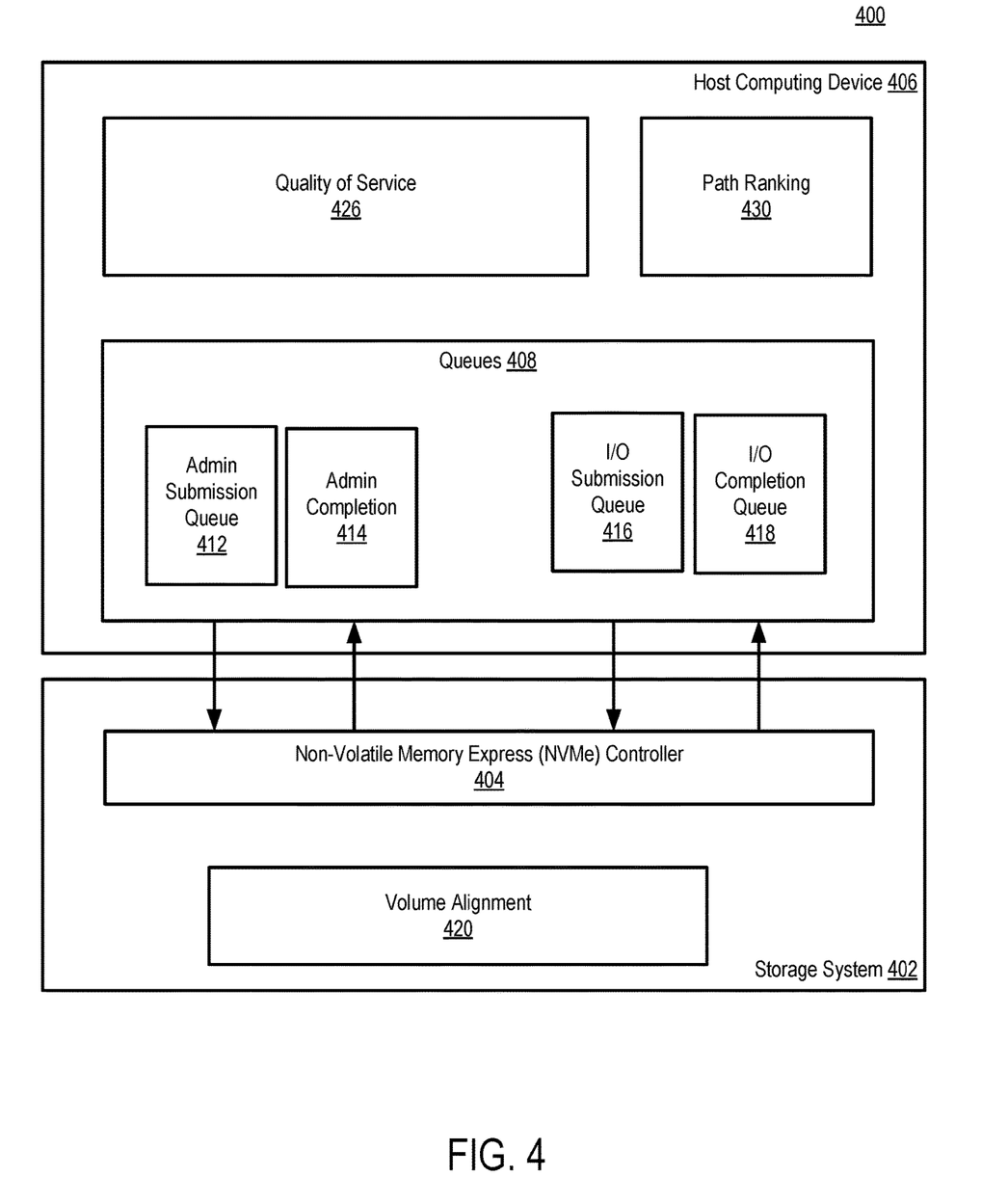
FIG. 4 is an organization diagram of an NVMeoF data storage architecture, according to aspects of the present disclosure.

An NVMeoF data storage architecture 400, in which various embodiments may be implemented, is shown in FIG. 4.

The data storage architecture 400 includes a storage system 402 including an NVMe controller 404 that is communicatively coupled to a host computing device 406. As shown, the host computing device 406 provides a plurality of queues 408 in host memory. These queues communicate I/O between the host computing device 406 and the controller 404. In more detail, host software of the host computing device 406 place commands into a submission queue (e.g., admin submission queue 412 for device management and control commands or I/O submission queue 416 for storage volume I/O commands) to provide the commands to the controller 404. Completions are placed into an associated completion queue (e.g., admin completion queue 414 for device management and control commands or I/O completion queue 418 for storage volume I/O commands) by the controller 404, to indicate to the host computing device 406 the completed status of the commands.

As shown, the host computing device 406 is further structured with a module to determine the quality of service 426 (e.g., based on response time and/or throughput corresponding to I/O that is communicated between the host computing device 406 and the controller 404), as well as a module to determine path rankings 430 based on a determined quality of service corresponding to each path.

As shown, the storage system 402 is further structured to include a volume alignment module 420. In more detail, in some examples, a multipath driver of a host computing device is allowed to direct I/O to a non-optimal path in an asymmetric storage array and allow sustained sub-optimal performance. While this feature may be advantageous in some instances, a cost may be that the storage user's host application may suffer some sustained I/O performance degradation. Accordingly, the storage system 402 shown here includes a volume alignment module 420 to further improve I/O performance.

In some examples, the volume alignment 420 module maintains an assignment of a storage volume to a storage controller (e.g. controller 404) with a least recent path fault. This feature provides advantages over the non-modified technique in that the host application may settle into sustained optimal performance from a symmetric access standpoint, with the potential cost being that bandwidth may be reduced due to the possibility of all volumes being owned on a single storage controller and not utilizing the alternate storage controller. In this example, the storage user may have a highly tuned SAN environment where a user expects volume ownership to match the ownership setting at the time the volumes were provisioned.

In other examples, the volume alignment 420 module re-aligns ownership of a storage volume to a non-owning storage controller when it is determined that greater than a threshold amount of I/O for the storage volume is received by non-owning storage controllers for greater than a threshold amount of time. When these thresholds are met, the volume alignment module 420 responds by assigning ownership of the storage volume to a storage controller that received the plurality of the I/O. In some examples, the threshold amount of I/O is set to 75% and the duration is set to five minutes. In other examples, other thresholds may be used.

In some examples, the volume alignment 420 module performs the techniques described in U.S. patent application Ser. No. 14/251,082, entitled Connectivity-Aware Storage Controller Load Balancing, to re-align ownership of the storage volume to a different storage volume. In other examples, the volume alignment 420 module fails back ownership of one or more volumes from a non-owning storage controller upon detection of recovery from a fault, which may occur based on its receipt of specific protocol-level discovery commands (e.g., SCSI Inquiry, NVMe Identify).

The present embodiments can take the form of an entirely hardware embodiment, an entirely software embodiment, or an embodiment containing both hardware and software elements. In that regard, in some embodiments, the computing system is programmable and is programmed to execute processes including the processes of the method 200 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   determining, by a host computing device, quality of service information corresponding to a plurality of paths between the host computing device and a storage volume of a storage system;
   identifying, by the host computing device, a target path from among the plurality of paths based on the determined quality of service information for routing input/output (I/O) between the host computing device and the storage volume, wherein the target path includes a non-owning storage controller of the storage system; and
   re-routing, by the host computing device, the I/O from an existing path to the target path.

2. The method of claim 1, further comprising:
   polling, by the host computing device, the storage system for path information corresponding to the plurality of paths.

3. The method of claim 1, wherein the identifying further comprises:
   selecting, by the host computing device, a candidate path from among the plurality of paths that includes a storage controller of the storage system recommended by the storage system for use as the target path.

4. The method of claim 1, further comprising:
   receiving, by the host computing device from the storage system, an indication of a change of ownership of the storage volume from an owning storage controller of the storage system to the non-owning storage controller of the storage system; and
   subsequently transmitting, by the host computing device, a plurality of I/O requests according to the change in ownership.

5. The method of claim 1, further comprising:
   detecting, by the host computing device, a fault corresponding to the existing path in response to an increase in a response time measurement, wherein the quality of service information includes the response time measurement.

6. The method of claim 1, further comprising:
determining, by the host computing device, a response time measurement corresponding to communications between the host computing device and the storage system, wherein the quality of service information includes the response time measurement.

7. The method of claim 1, further comprising:
determining, by the host computing device, a throughput measurement corresponding to communications between the host computing device and the storage system, wherein the quality of service information includes the throughput measurement.

8. A computing device comprising:
a memory containing machine readable medium comprising machine executable code having stored thereon instructions for performing a method of multipath selection;
a processor coupled to the memory, the processor configured to execute the machine executable code to cause the processor to:
receive a path indication from a storage system;
determine quality of service information corresponding to a plurality of paths between the computing device and a storage volume of the storage system;
identify a target path from among the plurality of paths based on the determined quality of service information for routing input/output (I/O) between the computing device and the storage volume and based on the path indication, wherein the target path includes a non-owning storage controller of the storage system; and
re-route the I/O from an existing path to the target path.

9. The computing device of claim 8, the machine executable code further causing the processor to:
poll the storage system for the path indication.

10. The computing device of claim 8, the machine executable code further causing the processor to:
select a candidate path from among the plurality of paths that includes a storage controller of the storage system recommended by the storage system for use as the target path.

11. The computing device of claim 8, the machine executable code further causing the processor to:
receive, from the storage system, an indication of a change of ownership of the storage volume from an owning storage controller of the storage system to the non-owning storage controller of the storage system; and
transmit, by the computing device, subsequent to the change in ownership a plurality of I/O requests according to the change in ownership.

12. The computing device of claim 8, the machine executable code further causing the processor to:
detect a fault corresponding to the existing path in response to a decrease in a throughput measurement, wherein the quality of service information includes the throughput measurement.

13. The computing device of claim 8, the machine executable code further causing the processor to:
determine a response time measurement corresponding to communications between the computing device and the storage system, wherein quality of service information includes the response time measurement.

14. The computing device of claim 8, wherein the quality of service information comprises at least one of a response time measurement or a throughput measurement.

15. A non-transitory machine-readable medium having stored thereon instructions for performing a method comprising machine executable code which when executed by at least one machine, causes the at least one machine to:
determine quality of service information corresponding to a plurality of paths between the at least one machine and a storage volume of a storage system, the quality of service information being based on at least one of a response time measurement and a throughput measurement between the at least one machine and the storage system;
identify a target path from among the plurality of paths based on the determined quality of service information for routing input/output (I/O) between the at least one machine and the storage volume, wherein the target path includes a non-owning storage controller of the storage system; and
re-route the I/O from an existing path to the target path.

16. The non-transitory machine-readable medium of claim 15, further comprising machine executable code that causes the at least one machine to:
poll the storage system for path information corresponding to the plurality of paths.

17. The non-transitory machine-readable medium of claim 15, further comprising machine executable code that causes the at least one machine to:
select a candidate path from among the plurality of paths that includes a storage controller of the storage system recommended by the storage system for use as the target path.

18. The non-transitory machine-readable medium of claim 15, further comprising machine executable code that causes the at least one machine to:
receive, from the storage system, an indication of a change of ownership of the storage volume from an owning storage controller of the storage system to the non-owning storage controller of the storage system; and
subsequently transmit, by the at least one machine, a plurality of I/O requests according to the change in ownership.

19. The non-transitory machine-readable medium of claim 15, further comprising machine executable code that causes the at least one machine to:
detect a fault corresponding to the existing path in response to an increase in a response time measurement, wherein the quality of service information includes the response time measurement.

20. The non-transitory machine-readable medium of claim 15, further comprising machine executable code that causes the at least one machine to:
rank, prior to the identification, the plurality of paths based on the quality of service information.

* * * * *